(12) United States Patent
Schuster et al.

(10) Patent No.: US 6,274,219 B1
(45) Date of Patent: Aug. 14, 2001

(54) MULTILAYER FORMED PART AND METHOD OF MANUFACTURING SAME

(75) Inventors: Dieter Schuster, Sassenburg; Roland Meyer, Wolfenbüttel, both of (DE)

(73) Assignee: Sommer Allibert-Lignotock GmbH (DE)

( * ) Notice: Subject to any disclaimer, the term of this patent is extended or adjusted under 35 U.S.C. 154(b) by 0 days.

(21) Appl. No.: 09/127,359

(22) Filed: Jul. 31, 1998

(30) Foreign Application Priority Data

Aug. 2, 1997 (DE) .......................................... 297 13 779 U

(51) Int. Cl.[7] .......................................................... B32B 3/02
(52) U.S. Cl. .............................. 428/138; 428/91; 428/96; 442/337; 442/366; 442/394; 442/398
(58) Field of Search ..................................... 428/594, 614, 428/913, 85, 90, 91, 222, 171, 156, 192, 297.1, 317.9, 35.7, 96, 159, 161, 409, 138; 264/241, 257; 181/284, 290; 442/394, 398, 366, 337

(56) References Cited

U.S. PATENT DOCUMENTS

| | | | |
|---|---|---|---|
| 4,298,643 | * 11/1981 | Miyagawa | 428/85 |
| 4,420,526 | * 12/1983 | Schilling et al. | 428/171 |
| 4,859,524 | * 8/1989 | Kim et al. | 428/236 |
| 5,326,523 | * 7/1994 | Gustavel et al. | 264/257 |
| 5,514,458 | * 5/1996 | Schulze-kadelbach | 428/246 |
| 5,527,581 | * 6/1996 | Sugawara et al. | 428/71 |
| 6,048,628 | * 4/2000 | Hillmann et al. | 428/594 |

OTHER PUBLICATIONS

Eisele, Dieter, "Recyclate aus Reissbaumwolle und Phenoplast—ein bewährtes System", Melliand Textilberichte, Nov. 1992, pp. 873 to 878.

* cited by examiner

Primary Examiner—Deborah Jones
Assistant Examiner—Abraham Bahta
(74) Attorney, Agent, or Firm—Young & Basile, P.C.

(57) ABSTRACT

A multilayer formed part having acoustic damping properties is composed of a binder containing carrier fibrous web of natural fibers and/or synthetic fibers of low compression, which is covered at both sides with cover layers and/or decorative layers. The carrier fibrous web across the surface thereof is interlaced with prismatic regions of any suitable cross section, with prismatic regions having increased strength and not being connected with each other, and being connected to the covering layer and/or the decorative layer in a shearing resistant manner.

22 Claims, 3 Drawing Sheets

MULTILAYER FORMED PART AND METHOD OF MANUFACTURING SAME

FIELD OF THE INVENTION

The invention relates to a multilayer formed part as well as a method of manufacturing the same.

BACKGROUND OF THE INVENTION

Such formed parts are employed for inner coverings in motor vehicles particularly in the region of the trunk. Duroplastics, especially phenolic resins, are used as binders. An illustrative example of this prior art is Eisel, D. "Recyclate aus Reißbaumwolle und Phenoplast—ein bewährtes System," *Melliand Textilberichte*, November 1992, pages 873 to 878.

Due to the low compression of the carrier fibrous web forming the core of the sandwich structure, such formed parts exhibit good acoustic properties However, these formed parts are not sufficiently rigid despite the sandwich structure, since the low compression carrier fibrous web is "weak to shearing," only restrictedly transmitting shearing forces as well, and thus not being ideal for the core of a sandwich construction. Hence, it has been common practice for quite some time to improve the rigidity of such formed parts, especially the package trays for which such increased carrying capacity is required. Such rigidity has been improved, by at least one of the following measures:

Incorporating reinforcing fibers such as glass fiber, flax fibers or high-strength synthetic fibers as well into the carrier fibrous web;

Incorporating metal inserts into the carrier fibrous web; and

"Hard" pressing of a greater marginal region, in order to gain more rigidity there by means of a greater marginal region and by a greater compression of material.

However, incorporating of reinforcing fibers means a greater manufacturing requirement. As far as natural fibers such as flax is concerned, it has to be reckoned with an odor emission; mineral fibers affect in case a considered recycling. The same applies for metal inserts too, which cause both a considerable expenditure in manufacturing and still a significant weight gain of the formed parts as well. The branch-used utilization of phenolic resins is uncertain with regard to the climate inside the seating compartment. Hence, the car industry more frequently demands for a substitute of duroplastics by thermoplastic binders, not least with regard to a better recycling capability of thermoplastic binders, as well.

A "hard" pressing of the marginal regions is only operative when these regions are adequately large. Usually, they comprise more than one third of the formed part surface. For improvement of the seating compartment acoustic, the "hard" pressed regions of formed part are no longer usable.

SUMMARY OF THE INVENTION

Therefore, it is the object of the invention to improve the (flexural strength) rigidity of precharacterized multilayer formed parts with renunciation of reinforcing inserts as well as to enhance the recycling capability of such formed parts. It is the further object of the invention to minimize the surface portion that is not usable for acoustic improvements. Finally, it is also the object of the invention to mention manufacturing methods for such formed parts.

Thereby the carrier fibrous web distributed across the surface is interlaced with prismatic regions, which give an increased strength to the carrier fibrous web and which are connected to the cover layer and/or decorative layer in a shearing resistant manner, the properties of the sandwich become independent of the pressing degree of the carrier fibrous web of the medium layer. The sandwich properties of the multilayer structure are determined within the region of less pressed carrier fibrous webs being important to the acoustic properties only by sort, material, size and distribution of the prismatic regions, which surface requirement thereof is distinctly less than the surface requirement of the hard pressed margins of the formed part in the prior art.

Hence, the strength characteristics of the formed parts can largely be optimized independent of the acoustic parameters thereof.

BRIEF DESCRIPTION OF THE DRAWINGS

This invention will now be explained in detail according to the embodiments shown in FIGS. 1 to 6, in which.

DETAILED DESCRIPTION OF THE PREFERRED EMBODIMENTS

Figure 1:
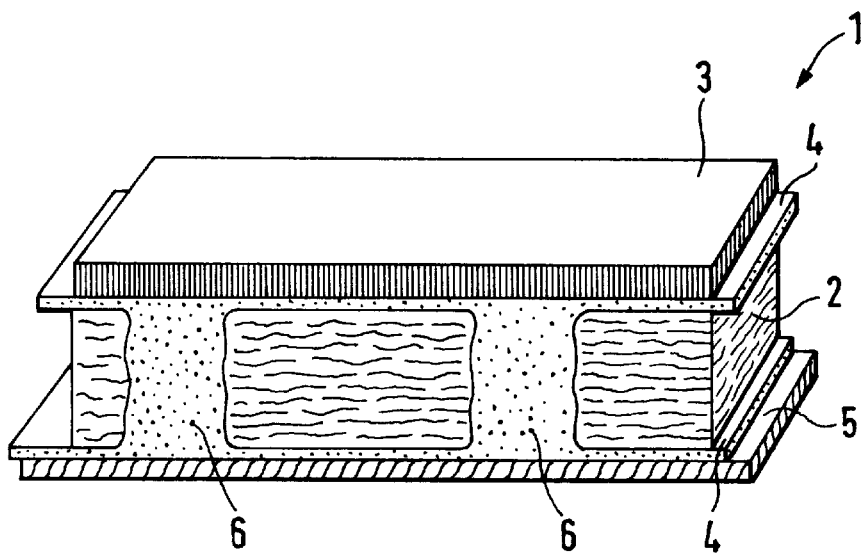
FIG. 1 shows a section through the layer structure of a formed part according to the invention.

Basically, formed parts according to the invention can be realized with all suitable materials or combinations thereof. For example, cotton is common as fiber for the carrier fibrous web, other natural fibers and synthetic fibers (or respective mixtures of such fibers) achieve the provided purpose as well, since the required inherent stability no longer depends on the carrier fibrous web. Experiments confirmed that the prismatic regions need not be connected to one another in order to satisfy the given strength requirements.

The effect of the prismatic regions inside the finished formed part does not only depend on shearing resistant tying to the cover layers, but also on its flexural strength, which is additionally determined by the cross sectional form of these regions. It is to be understood that any suitable cross sectional shapes may be used. However, in a preferred embodiment a star-shaped cross section for the intended purpose is particularly appropriate, when a rectangular cross section is not selected. A rectangular cross section is particularly appropriate when the ratio of length to width is greater than 30:1 and when the prisms are approximately oriented towards the maximum extension of the formed part. Such prismatic regions do not only encourage the sandwich function, but additionally act as rod shaped reinforcements to bending stresses.

When the prismatic regions of increased strength are uniformly distributed across the surface of the formed part, it can better meet the spectrum of requirements of the formed part, as a rule with reduced material and weight expenditures.

Suitable formed parts result from the cover layer and/or decorative layer being thermoplastically deformable, the fibers of the carrier fibrous web being thermoplastically bonded, and the prismatic regions of increased strength interlacing the carrier fibrous web being prisms of thermoplast.

Then the improvement of rigidity of formed parts according to the invention permits doing without duroplastics as binder only, but also the required quantity of thermoplastic binder being used as an alternative in the normal case will not exceed 30 percent in weight. In any case, a portion of 50 percent in weight is sufficient to consider extreme requirements. When the thermoplastic binder having fiber form is added to the carrier fibrous web, it can already be incorporated not segregating during fibrous web formation, whereby a good homogeneity of the carrier fibrous web is guaranteed. Since the prisms as well are composed of a thermoplastic material, a wide material compatibility is allowed to be realized, if required, and thus the recycling behavior of the formed parts is allowed to be improved.

With the present prior art in many cases, the cover and decorative layers as well are permitted to be formed from the same material. Another advantageous embodiment of formed parts according to the invention is in that the prismatic regions of increased strength are regions in which the carrier fibrous web has a greater compression with the same thickness. This modification enables the elongated rectangular prisms to be provided with a length to width ratio of at least 30:1, which does not only increase the sandwich effect of the interlaminar bonding by an improved shearing strength inside the cure region, but additionally they also reduce the deflection of the formed part under load, since they act as a stiffening insert even if one would disregard the sandwich effect.

Particularly advantageous with the present invention is that the thickness of the formed parts is maintained in the region of a higher compression. The section modulus of a rectangular cross section increases with the third power of the thickness, and styling is not compromised by transitions between cross sections. Hence, the compression regions can include additional fibers, also if necessary fibers different from those of the carrier fibrous web. Herein, the prior art offers a plurality of materials as well, such that points of view of forming, strength and capability of recycling can be considered. Hence, the compression regions can include 5 to 25 percent in weight of supplementary material relative to the weight of the carrier fibrous web of the formed part. The range of 10 to 15 percent in weight has proven to be particularly suitable for a balanced ratio of strength and acoustic properties. Hence, with it the compression regions have a compression being 50 to 120% higher than the core fibrous web (carrier fibrous web) of the finished formed part. With these values the surface portion of the compression prisms is also insured to be 3 to 30%, preferably 8 to 15% of the total surface of the formed part. An improvement of the acoustic behavior is achievable in any case, wherein the formed part has approximately uniform wall thicknesses of 6 to 12 mm, preferably 8 to 10 mm, with basis weights of 2000 to 3500 g/m². The basis weight is to be understood as the total weight of the formed part relative to the surface thereof.

The improvement of rigidity of formed parts according to the invention does not only permit working without duroplastics as binder; the required quantity of the thermoplastic binder, which is used as an alternative, will not exceed 30 percent in weight in the normal case. In any case, a portion of 50 percent in weight is sufficient in order to consider extreme requirements as well. When the thermoplastic binder is added to the carrier fibrous web in a fiber form, it can be incorporated not segregating during fibrous web formation, whereby a good homogeneity of the carrier fibrous web is also insured with the further fabrication. With structural panels for improving the acoustics, which are composed of a covered fiber core, the cover layer facing the room is frequently provided with an aperture pattern, which function thereof is well known for sound dissipation (acoustic transmission of sound waves into fibrous web material having open porosity, air friction inside the pores of the fiber material). If required, such a measure is also possible and advantageous with formed parts according to the invention.

The viewing side of formed parts for covering the trunks of vehicles is generally formed with a carpet material, which can directly be used as a covering layer with the formed parts according to the invention. Mechanically, thermally or chemically bonded matted laminate webs having basis weights of 50 to 200 g/m² appropriately serve as a second cover layer. The cover layers can be coated with hot-melt-type adhesive upon its side facing the carrier fibrous web for adhering improvement and/or can be reinforced with a thermoplastic film for further improvement of the inherent stability.

Hereinafter are disclosed two typical multilayer structures of formed parts according to the invention and being suitable for resilient package trays.

Structure 1: formula with thermoplastic prisms
Cover layer, viewing side:
   velour carpet material, reinforced with polypropylene (PP)-film (0.1 to 0.3 mm thickness)
Cover layer, rear side:
   fibrous web, polypropylene (PP), basis weight≧50 g/m², reinforced with PP-film (0.1 to 0.33 mm thickness)
Carrier fibrous web:
   cotton fibers having 25 to 40 percent in weight PP binder fibers, basis weight 1500 to 2000 g/m², 100 to 200 holes, diameter of 5 mm, filled with PP powder or granule
Formed parts:
   after pressing: 10 to 15 mm thickness.
   The upper and lower numerical values (the range limited therewith) hence consider differences in size of the formed parts and different stress requirements.
Structure 2: formula with compression prisms
Cover layer, viewing side:
   velour carpet material, reinforced with PP-film (0.1 to 0.3 mm thickness)
Cover layer, rear side:
   fibrous web, PP, basis weight≧50 g/m², reinforced with PP-film (0.1 to 0.33 mm thickness)
Carrier fibrous web:
   double layer, cotton fibers having 10 to 50 percent in weight of PP binding fibers, wherein prismatic regions of greater compression being ribbon shaped oriented towards maximum extension of the formed part, interlace the carrier fibrous web layers of approximately constant thickness and being connected to the cover layers by bonding resistant to shearing.

Formed parts:

after pressing: 10 to 15 mm thickness.

The upper and lower numerical values (the range limited therewith) hence consider the differences in size of the formed parts and different stress requirements.

Both formulas can be machined to formed parts with simple procedures. For the case 1, stiffening with thermoplast prisms is aspired by a method in which a blank of the carrier fibrous web is punched according to the cross sections of prismatic regions of increased strength and then is positioned on the respective blank of a cover layer, wherein the holes inside the carrier fibrous web are subsequently filled with thermoplastic granule and/or thermoplastic powder, until a second layer is deposited, and wherein the thus obtained composite package is heated above the distortion temperature of the thermoplast components and is finally formed inside a cold tool at slight compression to a formed part and removed from the tool after curing by cooling.

Where prismatic regions are provided, holes are punched into the prefabricated carrier fibrous web, with the holes being filled with thermoplast powder or granule after depositing a cover layer. Thus, after depositing the second cover layer the web system can be heated over the distortion temperature of the thermoplastic components and then formed as a package inside a cold tool under slight compression. The thermoplast filling inside the holes of the carrier fibrous web after cooling then forms the connecting regions of increased strength between the cover layers. In manufacturing engineering, it is advantageous to completely prefabricate the interlaminar bonding as a semifinished product, which for example can be performed by means of hot-melt-type adhesive intermediate layers.

A compression during forming advantageously provides for good pressure contact between the connecting partners and does encourage the compacting of the thermoplast filling.

In the second case a method is applicable wherein a blank of the carrier fibrous web is positioned on a respective blank of a cover layer, in which then the supplementary material in the region of the provided compression prisms, the supplementary material and thereafter the second cover layer and/or decorative layer is deposited, wherein the thus laminated semifinished product is heated by means of contact heating to the melting temperature of at least one part of the thermoplastic binder, and wherein finally the heated semifinished product is formed in a cold tool under compressing to a formed part and is removed from the tool after curing by cooling.

An advantageous improvement of this procedure is that two fibrous web lengths are used as carrier fibrous web, which basis weights thereof complement each other to the desired basis weight of the formed part, and that the supplementary material of the compression ribbons is positioned between the two fibrous web lengths.

With this improvement it is particularly easy to realize a prefabrication toward a semifinished product with ease of operation.

In FIG. 1, numeral 1 designates a cut out region of the formed part. The carpet material 3 reinforced with PP film 4 forms the viewing side cover layer, wherein the matted laminate 5 together with the reinforcing PP film 4' forms the rear side cover layer. The carrier fibrous web 2, such as cotton fibers being compressed to 0.3 to 0.5 g/cm$^3$ and made dimensionally stable in compressed condition by means of PP binding fibers, is interlaced with the PP prisms 6, which are bonded with the two cover layers in a shearing resistant manner.

Figure 2:
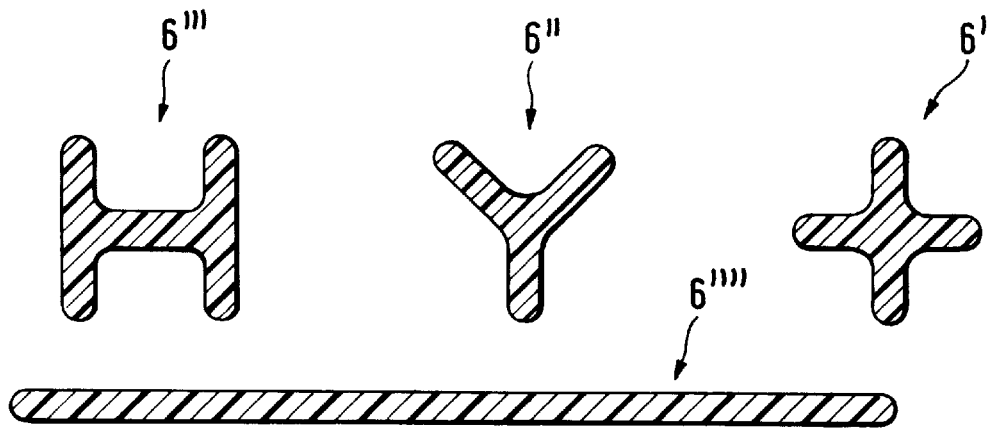
FIG. 2 shows some appropriate section forms for the connection prisms interlacing the carrier fibrous web, which differ from the circular section.

Some other sectional forms of connecting prisms 6', 6" and 6'" are shown in FIG. 2, which have appropriate pre-conditions with regard to a connection to the cover layers being resistant to shearing, especially for prisms filled with thermoplastic, wherein the square form 6"" is well suitable for stiffening ribbons having material compression.

Figure 3:
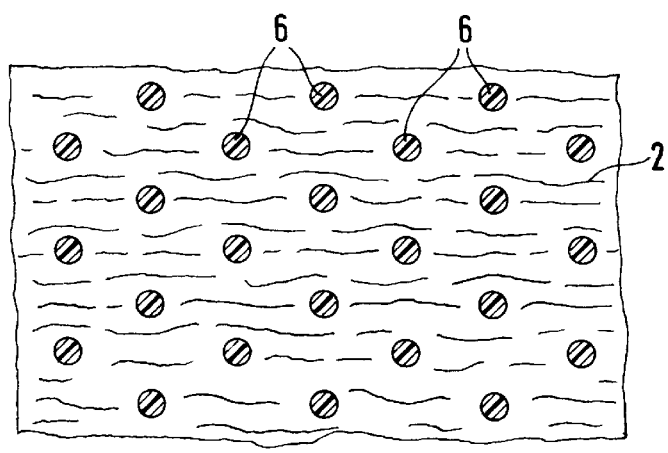
FIG. 3 explains in a top view upon a region of carrier fibrous web the configuration of the prismatic regions of increased strength.

FIG. 3 shows, according to a horizontal portion through a material region of a formed part according to the invention, how the prisms 6 distribute across the surface such as for prisms having circular cross section.

Figure 4:
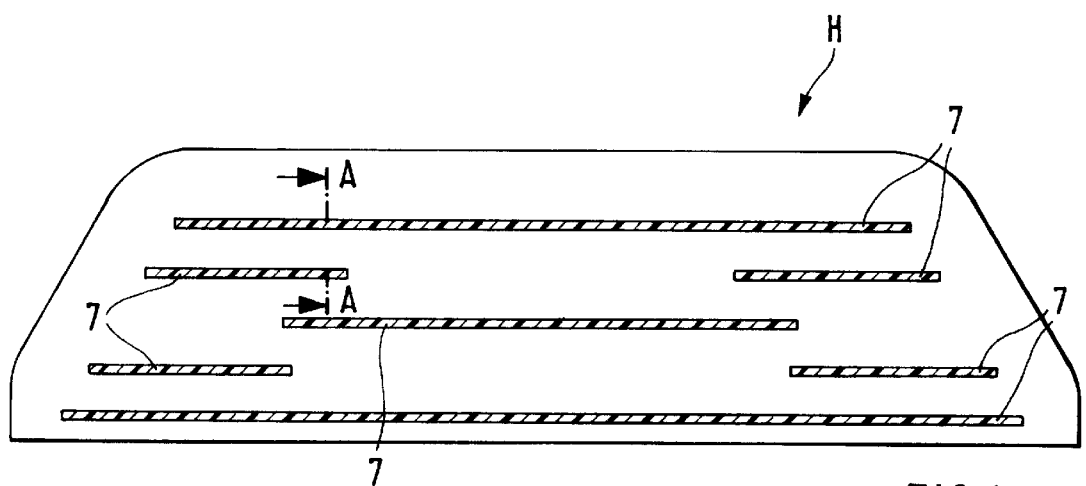
FIG. 4 reflects the position of stiffening rectangular prisms inside the contour of a diagrammatically shown package tray, wherein the rectangular prisms are compressed regions of material.

FIG. 4 shows the position of stiffening ribbons 7 inside the contour of a package tray designated with H, wherein the elongated regions of compression extending towards the maximum extension of the package tray H.

Figure 5:
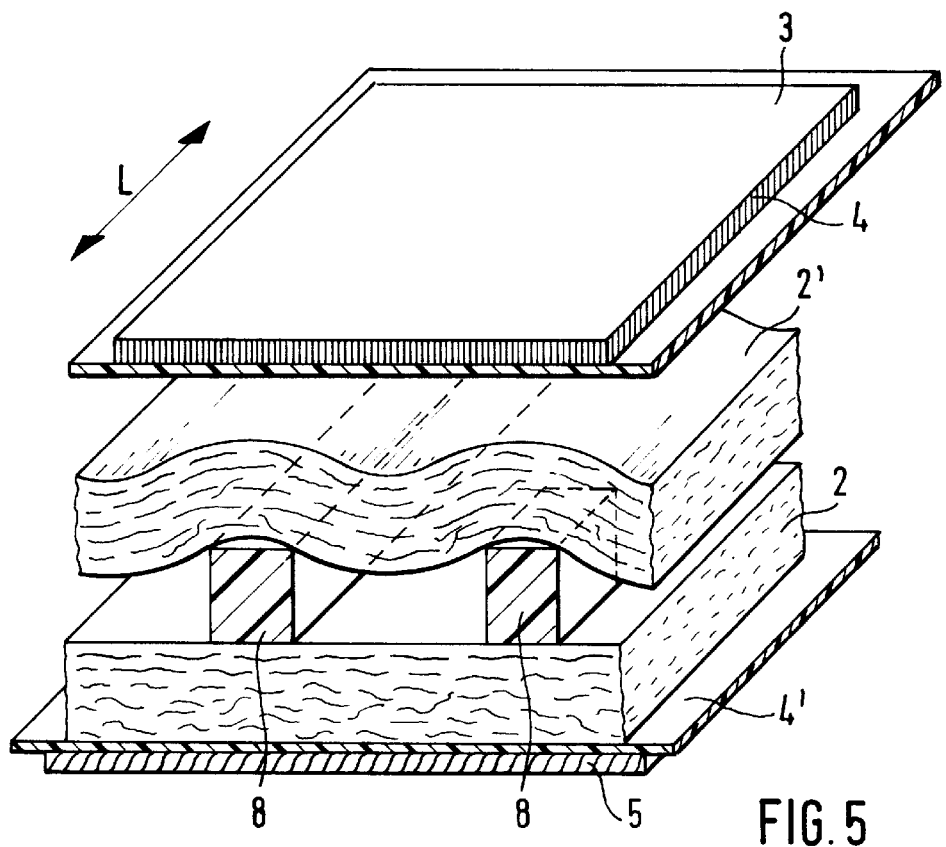
FIG. 5 explains in simplified perspective view a material cut out, which position thereof is characterized in FIG. 4 by the section A-A, to be precise prior forming to a formed part.

In FIG. 5, the two lengths of the carrier fibrous web are designated with numerals 2 and 2', between which the supplementary material 8 is located. The position of the shown material cut out corresponds with the section A—A in FIG. 4; the starting condition prior pressing is shown, wherein the direction of maximum extension is indicated with a double arrow L.

Figure 6:
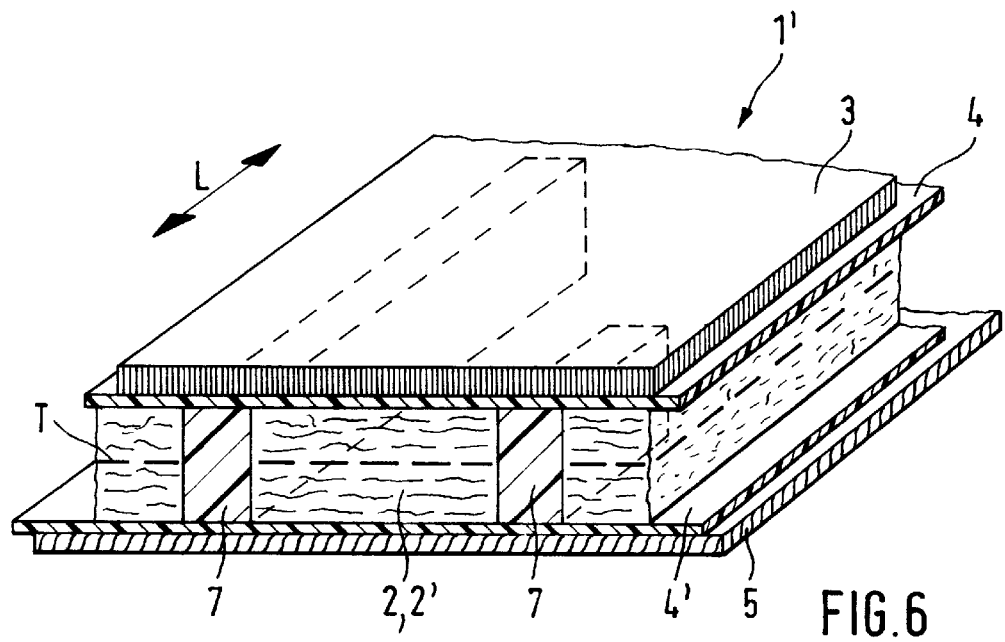
FIG. 6 finally shows the same material cut out as FIG. 5 after pressing to a formed part.

The same material cut out is shown in FIG. 6 in the pressed condition. The supplementary material 8 is compressed with the associated regions of the carrier fibrous webs 2, 2' to the stiffening ribbons 7; a division line T between the carrier fibrous webs 2, 2' is only fictitious, since in practice the two carrier fibrous webs 2, 2' are connected with each other, being of the same material.

What is claimed is:

1. A multilayer formed part having acoustic damping properties, comprising:
    a binder containing carrier fibrous web having two opposed sides the web formed from at least one of natural and synthetic fibers of low compression;
    at least one of a cover layer and a decorative layer disposed on both sides; and
    a plurality of prismatic regions of a predetermined cross section interlaced within and distributed across the fibrous web, each of the plurality of prismatic regions being surrounded by carrier fibrous web, the prismatic regions being connected in a shear resistant manner with at least one of the cover layer and the decorative layer;
    wherein the plurality of prismatic regions render the multilayer formed part with a predetermined rigidity.

2. A formed part according to claim 1, wherein each of the plurality of prismatic regions has a rectangular cross section, wherein the ratio of length to width of the rectangle is greater than 30, and the plurality of the rectangular prisms is oriented by approximation in the direction of the maximum extension of the formed part.

3. A formed part according to claim 1, wherein each of the plurality of prismatic regions comprise a star-shaped cross section.

4. A formed part according to claim 1, wherein the plurality of prismatic regions are uniformly distributed across the surface of the formed part.

5. A formed part according to claim 1, wherein at least one of the cover layer and decorative layer is thermoplastically deformable, wherein the fibers of the carrier fibrous web are thermoplastically bonded, and each of the plurality of prismatic regions are prisms of thermoplast.

6. A formed part according to claim 1, wherein the carrier fibrous web at the prismatic regions exhibits a high compression.

7. A formed part according to claim 1, wherein at least the binder of the carrier fibrous web and the material of the thermoplast prisms are of the same material.

8. A formed part according to claim 1, wherein the prismatic regions contain at least one of additional fibers and fibers other than the carrier fibrous web.

9. A formed part according to claim 1, wherein the prismatic regions contain 5 to 25%, of supplementary material, relative to the weight of the carrier fibrous web of the formed part.

10. A formed part according to claim 1, wherein the prismatic regions have a compression being 50 to 120% greater than that of the carrier fibrous web.

11. A formed part according to claim 1, wherein the portion of surface of the prismatic regions to the total surface of the formed part is 3 to 30%.

12. A formed part according to claim 1, wherein the formed part has uniform wall thicknesses of 6 to 12 mm by approximation, with basis weights of 2000 to 3500 g/m$^2$.

13. A formed part according to claim 1, wherein the binder portion of the carrier fibrous web is less than 50 percent in weight, wherein at least partly the binder is available in form of binding fibers.

14. A formed part according to claim 1, wherein at least one cover layer comprises acoustic panel perforations.

15. A formed part according to claim 1, wherein one of the cover layers is open to view and is a carpet material, and the cover layer on the other side is a fibrous web material.

16. A formed part according to claim 1, wherein a surface facing the carrier fibrous web of at least one cover layer is coated with a hot-melt-type adhesive.

17. A formed part according to claim 1, wherein at least one cover layer is reinforced with a thermoplastic film.

18. A formed part according to claim 1, having a layer structure comprising:

the decorative layer formed from velour carpet material, reinforced with a 0.1 to 0.3 mm film of polypropylene;

the carrier fibrous web defining a layer and being formed from cotton fibers comprising 10 to 50 percent in weight of polypropylene binding fibers;

the cover layer being oriented rearwardly:

the fibrous web layer having a basis weight of $\geq 50$ g/m$^2$ of at least one of polypropylene fibers and polyester fibers, reinforced with polypropylene film, the polypropylene film having a thickness of 0.1 to 0.33 mm, wherein there are 100 to 200 prismatic regions per m$^2$, the prismatic regions being composed of polypropylene and connected to the first and second cover layers in a manner resistant to shearing.

19. A formed part according to claim 1, having a layer structure comprising:

the decorative layer being formed from velour carpet material, reinforced with 0.1 to 0.3 mm thickness of polypropylene film;

the carrier fibrous web being formed from double-ply cotton fibers with polypropylene binding fibers the binding fibers being 10 to 50 percent in weight, the double-ply cotton fibrous web defining two fibrous web layers;

the cover layer being oriented rearwardly;

the fibrous web layers having a basis weight of $\geq 50$ g/m$^2$ of polypropylene fibers and/or polyester fibers, reinforced with polypropylene film, the film having a thickness of 0.1 to 0.3 mm, wherein the prismatic regions have a ribbon shape and are oriented in the maximum extension of the formed part, wherein the carrier fibrous web layers are of approximately constant thickness and are connected to the cover layers by bonding in a manner resistant to shearing.

20. A formed part according to claim 1, wherein the prismatic regions contain 10% to 15% of supplementary material, relative to the weight of the carrier fibrous web of the formed part.

21. A formed part according to claim 1, wherein the portion of surface of the prismatic regions to the total surface of the formed part is 8% to 15%.

22. A formed part according to claim 1, wherein the formed part has uniform wall thicknesses of 8 to 10 mm by approximation, with basis weights of 2000 to 3500 g/m$^2$.

* * * * *